United States Patent
Nuss

[11] 3,791,147
[45] Feb. 12, 1974

[54] AUTOMOBILE ACCESSORY DRIVE
[75] Inventor: Christopher Nuss, Warren, Mich.
[73] Assignee: Chrysler Corporation, Highland Park, Mich.
[22] Filed: Jan. 15, 1973
[21] Appl. No.: 323,555

[52] U.S. Cl.................... 60/422, 60/445, 60/449, 60/450
[51] Int. Cl............................................ F16h 39/46
[58] Field of Search..... 60/452, 445, 422, 420, 449, 60/450

[56] References Cited
UNITED STATES PATENTS
2,799,995  7/1957  Herman ........................ 60/422 X
2,892,311  6/1959  Van Gerpen .................. 60/422
2,936,712  5/1960  Van Gerpen .................. 60/445

Primary Examiner—Edgar W. Geoghegan

[57] ABSTRACT

A plurality of automobile accessory devices are driven by a single constant speed hydraulic motor by means of the constant fluid output from a variable displacement hydraulic power steering pump driven in turn by the automobile engine at speeds proportional to the engine speed. Constant fluid output from the pump is maintained by a displacement control means that controls the displacement of the pump inversely with the pressure differential across a predetermined restriction in the pump outlet.

15 Claims, 2 Drawing Figures

PATENTED FEB 12 1974 3,791,147

3,791,147

AUTOMOBILE ACCESSORY DRIVE

BACKGROUND AND SUMMARY OF THE INVENTION

This invention relates to improvements in engine driven means for driving automobile power accessories or devices such as the cooling fan, alternator, generator, power operated steering gear, brakes, windows, seats and the like.

A common characteristic of such devices is that they must operate with optimum effectiveness and power while the engine is idling, but usually require no more power and sometimes even less power, as in the case of the engine cooling fan or steering gear for example, when the automobile is operated at high speed. Thus during high speed operation, the engine drives the accessory or power devices at excessive speeds with consequent excessive wearing of the parts involved and waste of engine power.

Automobile designers have accordingly long desired simple and inexpensive means for driving such accessories or devices at optimum speeds during low speed engine operation and for maintaining the driving speed of the accessories or devices substantially constant when the engine speed increases. An example of a type of engine powered accessory drive means employed heretofore is the viscous fluid clutch connection between the engine and the fan for engine cooling air. Such a drive means is complex and expensive and is not entirely satisfactory for driving a plurality of accessories, both because too large a friction clutch is required and because such a clutch does not effect uniform transmission of speed to the accessory devices at all engine speeds.

An important object of the present invention is to provide an improved accessory driving means which avoids the foregoing limitations of the prior art and embodies the concept of driving a plurality of accessory devices from a single constant speed hydraulic motor, whereby each device is driven at an individual preselected constant speed proportional to the speed of the motor and independent of the power required to drive the motor, and of driving the motor at a constant speed by means of the fluid output from a variable displacement hydraulic pump driven by the automobile engine at speeds proportional to the engine speed. Constant fluid output from the pump is maintained by a displacement control means for regulating the displacement of the pump inversely with the pressure differential across a predetermined restriction in the pump outlet, thereby to effect a constant rate of fluid flow from the pump regardless of its speed of operation.

Another object is to provide an improved accessory drive of the above character in combination with an hydraulic power steering gear in series with the pump output and the motor whereby the usual hydraulic power steering pump is rendered unnecessary and the hydraulic flow to the steering gear is maintained constant regardless of the power demands of the steering operation. In the above regard, the motor and steering gear are designed to be operated at their respective desired constant speeds by the same constant rate of hydraulic fluid flow from the pump.

Such a construction avoids the usual hydraulic power steering pump and divider valve, which latter assures a constant rate of flow of hydraulic fluid to the power steering gear and bypasses the excess hydraulic fluid to the power steering pump inlet.

Other objects are to provide such an accessory drive or driving means comprising a resilient biasing means cooperable with the variable displacement pump to effect a predetermined constant pressure differential across the restriction for the pump output, and to provide a divider valve in the fluid output from the pump at a location upstream of the hydraulic motor and the valve for the power steering gear, whereby the predetermined rate of flow to power the steering gear will be directed first to the latter gear at the expense of the flow to the motor, thereby to assure adequate steering power at all times that the pump is operating and to avoid the requirement of a variable displacement pump of sufficient size to supply the maximum power required by all the accessories and hydraulic steering gear when operated simultaneously at maximum load.

Other objects of this invention will appear in the following description and appended claims, reference being had to the accompanying drawings forming a part of this specification wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENT

Figure 1:
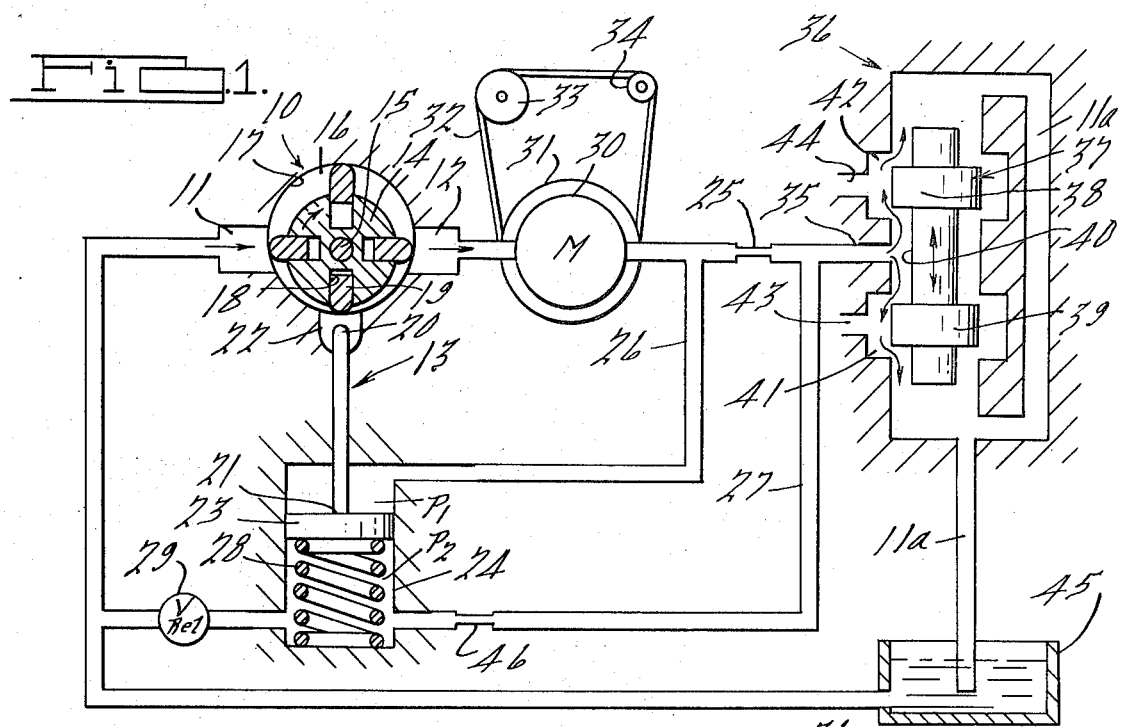
FIG. 1 is a schematic hydraulic circuit diagram illustrating one embodiment of the invention.

Referring to FIG. 1, a particular embodiment of the invention is illustrated comprising an engine driven variable displacement hydraulic pump 10 having an inlet 11 for low pressure fluid, an outlet 12 for high pressure fluid, and operable means 13 for varying the fluid output of the pump, whereby in the present instance the output is maintained constant. The pump 10 may be of conventional structure and is schematically illustrated as comprising a rotor 14 secured coaxially to a rotatable engine driven shaft 15 for rotation therewith. The shaft 15 is suitably powered directly by the automobile engine and may rotate at variable speeds depending on the engine speed. The rotor 14 rotates in a pumping chamber 16 defined by a shiftable cam 17 and contains a plurality of radially opening vane slots 18, each containing a radially slideable vane 19 having an outer edge that rides along the inner surface of cam 17.

The means 13 for varying the output of pump 10 includes a connecting rod connected at 20 and 21 respectively to a boss 22 of the cam 17 and to a pressure actuated piston 23 reciprocable within a cylinder 24. Movement of the piston 23 thus causes corresponding movement of the cam 17 to vary its eccentricity with respect to the axis of rotation of shaft 15 and rotor 14.

The pump outlet 12 is connected upstream and downstream of a restriction 25 by ducts 26 and 27 to the upper and lower ends respectively of cylinder 24. A biasing spring 28 within cylinder 24 yieldingly urges the piston 23 upwardly in a direction to increase the aforesaid eccentricity and thereby to increase the output of the pump 10 for any given rotational speed. It is apparent that when the piston 23 is in equilibrium, the upstream pressure $P_1$ against the upper face of piston 23 is balanced by the force S of spring 28 and the downstream pressure $P_2$ against the lower face of piston 23, such that the spring force S urging piston 23 upward is a measure of the pressure differential across restriction 25, i.e., $P_1 = S + P_2$ and $P_1 - P_2 = S$.

If the pressure differential $P_1-P_2$ momentarily decreases for any reason, piston 23 will be moved upward in FIG. 1 and increase the cam eccentricity and the pump output until the pressure differential across restriction 25 increases to the equilibrium value. If the pressure differential increases, piston 23 will be urged downwardly to decrease the cam eccentricity and pump output until the pressure differential across restriction 25 decreases to the equilibrium value. In consequence the arrangement shown tends to maintain a constant pressure differential across restriction 25, which in turn assures a constant rate of fluid flow therethrough. A pressure relief or safety valve 29 discharges from cylinder 24 to the pump inlet 11 at a predetermined high pressure to prevent a dangerous or excessive pressure in the system.

Also in the pump output line 12 is a fluid powered motor 30 for a rotatable pulley 31 which drives pulley belt 32 and rotates pulleys 33 and 34 for various engine powered accessories. By virtue of the constant fluid output of pump 10, motor 30 will rotate pulley 31 at a constant speed regardless of the engine speed, and pulleys 33 and 34 will also rotate at constant speeds determined by the ratios of their diameters with respect to the diameter of pulley 31.

The pump outlet 12 is connected with the fluid inlet 35 for a conventional open center automobile power steering valve 36 having a movable slide or spool valve element 37. The latter is manually shiftable in response to operation of the customary automobile steering wheel and is provided with a pair of annular lands 38 and 39 spacing a central recess 40 in communication with the inlet 35. The lands 38 and 39 cooperate with ports 42 and 41 respectively in a housing for spool valve 37. The ports 42 and 41 communicate with ducts 44 and 43 respectively which may lead to opposite sides of a conventional piston-type power steering motor for steering to the left or right in accordance with the direction of shifting of spool 37 relative to its housing.

At the centered or neutral position shown for spool 37, fluid from outlet 12 enters central recess 40 via inlet 35, flows substantially at equal rates into ports 41 and 42, and thence via return ducts 11a to reservoir 45 in communication with the pump inlet 11. If there is no steering load on the steering motor, only a slight back pressure will exist at ports 41 and 42 and in ducts 43 and 44 resulting from the frictional resistance in the fluid flow to sump lines 11a. This slight back pressure will be the same in both ducts 43 and 44, so no steering action will take place.

Upon shifting of spool 37 upward in FIG. 1, as for example in response to rightward turning of the automobile steering wheel, the communication between inlet recess 40 and port 41, and between port 42 and its sump line 11a, will be restricted. Simultaneously the communication between recess 40 and port 42, and between port 41 and its sump line 11a will be increased.

In consequence fluid flow via duct 44 to the steering motor and also fluid return flow from the steering motor to port 41 and sump 11a, will be enhanced to operate the steering motor for steering in one direction, as for example to the right. The housing for spool 37 is customarily connected with the steering gear or dirigible mechanism of the vehicle to follow the movement of spool 37. Thus after upward movement of spool 37, the resulting steering movement causes the housing for valve 37 to follow until the equilibrium condition shown is restored. Then the steering movement will stop until the steering wheel is again turned.

Similarly upon shifting of spool 37 in the opposite or downward direction in FIG. 1, power assisted steering in the opposite or left turn direction will be effected. Such steering operation is conventional. In order to avoid a too sudden rise in pressure at the underside of piston 23 in the event of a sudden increase in steering load, a secondary restriction 46 is provided in duct 27. The latter restriction will prevent damage to the pump 10 and its displacement control mechanism 13 but is not sufficient to unduly retard power steering in response to shifting of spool 37.

It is apparent that upon operation of the steering valve 36, the fluid pressure required to effect the steering operation will be sensed downstream of restriction 25 and will be transmitted therethrough to increase $P_1$ and maintain the constant pressure differential across restriction 25. The increased $P_1$ will be applied to both sides of motor 30, but will otherwise have no effect on the latter's operation. If additional load is applied to pulley 33 or 34 and thus to motor 30, the upstream fluid pressure to motor 30 will increase by virtue of the constant output of pump 10. Accordingly, the pressure differential across motor 30 will vary in accordance with the accessory power demand. The product of the latter pressure differential and the constant flow rate from pump 10 will equal the accessory power demand.

The restriction 25 is shown between the motor 30 and power steering valve 36, but the restriction 25 and the ducts 26 and 27 could also be located upstream of motor 30 or downstream of steering valve 36. The former location offers the advantage that no appreciable pressure would be applied to motor 30 unless it or the steering gear is subject to load. If the restriction 25 is located downstream of the steering valve 36, the latter at the neutral position shown would always be subject to $P_1$, which would be applied equally to both sides of the steering motor via ducts 43 and 44 and would magnify any mechanical unbalance or lack of symmetry in the steering valve 36 and might bias the steering in one direction or the other.

Figure 2:
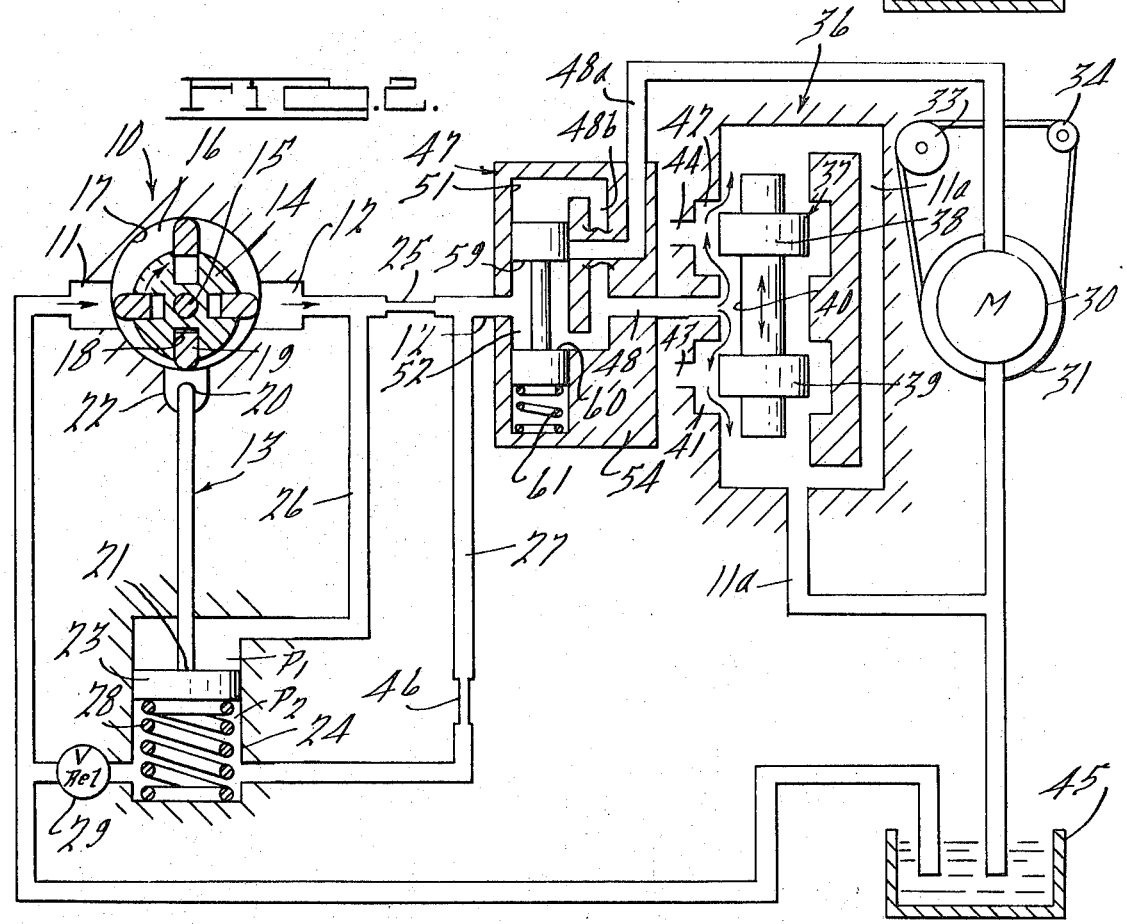
FIG. 2 is a schematic hydraulic circuit diagram illustrating another embodiment of the invention.

FIG. 2 illustrates a modification of the invention which enables priority of operation of the power steering gear at the expense of the accessories 33 and 34. Instead of providing the motor 30 and power steering valve 36 in series as in FIG. 1, operating fluid from pump 10 is supplied via a flow divider valve 47 located in the pump output 12 downstream of restriction 25 and duct 27 and upstream of both motor 30 and valve 36. The valve 47 may be conventional and is adapted to supply fluid first via duct 48 to the power steering valve 36 and then, if adequate power required to operate the steering gear does not exceed the capacity of pump 10, the excess fluid power supplied through outlet 12 is diverted via duct 48a to the motor 30.

Restriction 25 and spring 28 are preferably dimensioned so that the rate of flow from pump 10 into outlet 12 is not less than the desired maximum rate of flow for operation of the steering gear, and may be somewhat greater than the latter maximum. In such an event, when operation of the power steering gear is calling for maximum fluid power, some excess fluid power will be available to operate motor 30. As the power demand of the steering gear decreases, the fluid power supplied via duct 48 will decrease and the fluid power supplied via duct 48a to motor 30 will increase correspondingly. In all other respects the parts shown in FIG. 2 are the same in structure and operation as the correspondingly numbered parts of FIG. 1.

Many types of divider valves of varying complexity and sophistication are available for valve 47 to control the pressure and rates of flow in lines 48 and 48a. A simple type of valve 47 is illustrated wherein an annular spool valve reciprocable within a cylinder 51 in valve housing 54 has a central annular recess 52 spacing annular lands 50 and 60. Ducts 48a and 48 extend into housing 54 and selectively communicate with recess 52 upon operation of the spool valve. A spring 61 in the lower end of cylinder 51 urges the spool valve upward to partially but not completely close the communication between recess 52 and duct 48, and also to open the communication between recess 52 and duct 48a, when no appreciable power steering back pressure exists in duct 48. A branch duct 48b from duct 48 communicates with the upper end of cylinder 51 to urge the spool valve downward against the force of spring 61, thereby to close duct 48a and open duct 48 as illustrated when the fluid pressure in duct 48 increases during a steering operation.

In the above regard the opening of duct 48 into recess 52 will never completely close because some fluid flow in duct 48 will be necessary to initiate a pressure rise in the latter duct and in branch 48b to move the spool valve downward and open duct 48 in the event of a power steering demand. The communication between duct 48a and recess 52 may or may not be closed completely during a power steering operation, depending on the capacity of the pump 10 to supply fluid power in excess of the maximum power required for steering, as described above.

During operation of valve 47, when no load is on motor 30 or power steering valve 36, the spool valve lands 59 and 60 will be urged upward by spring 61 to open duct 48a into recess 52 and to substantially close duct 48 except for a restricted leakage flow to the power steering valve 36. Fluid is supplied at a constant rate and without appreciable pressure via pump outlet 12, as described above, to recess 52, thence primarily through duct 48a to motor 30 (and to a lesser extent through duct 48 and valve 36) and finally to sump line 11a. When an accessory power demand or load is applied to motor 30, the fluid pressure in duct 48a will rise to meet the power demand. The increased pressure in duct 48a will also be applied across the restricted communication between recess 52 and duct 48, but this flow will be nominal and will serve merely to develop pressure in duct 48 immediately in the event that a power steering load is applied by manual shifting of spool 37 from the neutral position. In the latter event, pressure will also rise in duct 48b and cause the spool valve lands 59 and 60 to move downward to increase the opening for pressurized fluid into duct 48 and to decrease the communication between duct 48a and the output 12 correspondingly. At maximum power steering demand, port 48a may be completely closed, depending on whether or not the predetermined rate of flow through restriction 25 exceeds the maximum power steering requirement.

I claim:

1. In a hydraulic means powered by an automobile engine for driving a power steering gear and a hydraulic motor for various power operated devices at substantially uniform preselected speeds regardless of the speed of said engine and the power demands of said gear and motor, the combination of a variable displacement hydraulic pump adapted to be driven by said engine, conduit means connected with the pump to receive the fluid output therefrom including said hydraulic motor driven by said fluid output, an open center valve in communication with the fluid outlet of said motor to receive the fluid discharged therefrom and selectively operable to apply the latter fluid to said steering gear, a restriction in said conduit means upstream of said open center valve, and means for maintaining the rate of flow of said fluid output substantially constant regardless of changes in the operating speed of said pump or in the pressure of said fluid output comprising displacement control means responsive to the pressure differential across said restriction and operatively connected with said pump for increasing or decreasing the displacement thereof when said pressure differential decreases or increases respectively.

2. In the combination according to claim 1, said valve and motor being in series with the fluid output of said pump and said steering gear and motor being designed to operate at optimum preselected speeds when powered by said constant rate of flow, and said restriction being downstream of said motor.

3. In the combination according to claim 2, said displacement control means having separate parts in communication with said conduit means upstream and downstream of said restriction respectively, and biasing means for determining the pressure differential across said restriction comprising means for applying a predetermined force cooperable with said displacement control means for yieldingly urging increased displacement for said pump.

4. In the combination according to claim 3, and a plurality of power operated devices operatively connected with said motor to be driven thereby at preselected speeds proportional to the speed of said motor.

5. In the combination according to claim 3, and a second restriction in the communication between said displacement control means and conduit means downstream of the first named restriction.

6. In a hydraulic means powered by an engine for driving a hydraulic motor for various power operated devices at a substantially uniform preselected speed regardless of the speed of said engine and the power demands of said devices, the combination of a variable displacement hydraulic pump adapted to be driven by said engine, conduit means connected with the pump to receive the fluid output therefrom, said conduit means including a hydraulic motor for said devices and driven by said fluid output, a restriction in said conduit means, and means for maintaining the rate of flow of said fluid output substantially constant regardless of changes in the operating speed of said pump or in the pressure of said fluid output comprising displacement control means responsive to the pressure differential across said restriction and operatively connected with said pump for varying the displacement thereof inversely with respect to variations in said pressure differential.

7. In the combination according to claim 6, said motor having power take-off means, and a plurality of power operated devices operatively connected with said power take-off means to be driven thereby.

8. In the combination according to claim 6, said displacement control means comprising pressure actuated means having separate parts in communication with said conduit means upstream and downstream respectively of said restriction and urged by increasing pressure upstream of said restriction to decrease said displacement and by increasing pressure downstream of said restriction to increase said displacement, and biasing means yieldingly cooperable with said displacement control means in opposition to said upstream pressure for increasing said displacement.

9. In the combination according to claim 8, and a plurality of power operated devices operatively connected with said motor to be driven thereby at speeds proportional to the speed of said motor.

10. In the combination according to claim 9, said motor being in said conduit means in series with said pump and said restriction being downstream of said motor.

11. In the combination according to claim 8, said motor being in said conduit means in series with said pump and said restriction being downstream of said motor.

12. In a hydraulic means powered by an automobile engine for driving a power steering gear and a hydraulic motor for various power operated devices at speeds not greater than preselected maximum speeds regardless of the speed of said engine and the power demands of said gear and motor, the combination of a variable displacement hydraulic pump adapted to be driven by said engine, conduit means connected with the pump to receive the fluid output therefrom including said hydraulic motor driven by said fluid output and an open center valve selectively operable to apply said fluid output to said steering gear, flow control means in said conduit means upstream of said motor and open center valve for directing a predetermined rate of flow of said fluid output to said motor and open center valve, said flow control means including means responsive to the pressure at said open center valve for directing said fluid output first to said open center valve at the expense of fluid flow to said motor, thereby to effect priority of fluid flow to said power steering gear during operation of said pump, a restriction in said conduit means upstream of said flow control means, and means for maintaining the rate of flow of said fluid output substantially constant regardless of changes in the operating speed of said pump or in the fluid pressure at the pump outlet comprising displacement control means responsive to the pressure differential across said restriction and operatively connected with said pump for increasing or decreasing the displacement thereof when said pressure differential decreases or increases respectively.

13. In the combination according to claim 12, said displacement control means comprising pressure actuated means having opposite sides in communication with said conduit means upstream and downstream respectively of said restriction and being movable by the pressures in said conduit means upstream and downstream respectively of said restriction for decreasing or increasing the displacement of said pump, and biasing means cooperable with said pressure actuated means for yieldingly increasing said displacement.

14. In the combination according to claim 13, a second restriction in the communication between said pressure actuated means and conduit means at the downstream side of said restriction.

15. In the combination according to claim 12, said displacement control means comprising pressure actuated means having opposite sides in communication with said conduit means upstream and downstream respectively of said restriction and being movable by the pressures in said conduit means upstream and downstream respectively of said restriction for decreasing or increasing the displacement of said pump, and a second restriction in the communication between said pressure actuated means and conduit means at the downstream side of said restriction.

* * * * *